United States Patent [19]

Ejzak et al.

[11] Patent Number: 5,444,718
[45] Date of Patent: Aug. 22, 1995

[54] RETRANSMISSION PROTOCOL FOR WIRELESS COMMUNICATIONS

[75] Inventors: Richard P. Ejzak, Wheaton, Ill.; Sanjiv Nanda, Plainsboro, N.J.

[73] Assignee: AT&T Corp., Murray Hill, N.J.

[21] Appl. No.: 159,871

[22] Filed: Nov. 30, 1993

[51] Int. Cl.⁶ ............................................. H04L 1/16
[52] U.S. Cl. ............................................. 371/32
[58] Field of Search ............................. 371/32, 33

[56] References Cited

U.S. PATENT DOCUMENTS

| | | | |
|---|---|---|---|
| 4,422,171 | 12/1983 | Wortley et al. | 371/32 |
| 4,439,859 | 3/1984 | Donnan | 371/32 |
| 4,841,526 | 6/1989 | Wilson et al. | 371/32 |
| 5,007,051 | 4/1991 | Dolkas et al. | 370/85.1 |
| 5,084,877 | 1/1992 | Netravali et al. | 371/32 |
| 5,245,616 | 9/1993 | Olson | 371/32 |
| 5,319,648 | 6/1994 | Bux et al. | 371/32 |

*Primary Examiner*—Stephen M. Baker
*Attorney, Agent, or Firm*—Frederick B. Luludis

[57] ABSTRACT

The throughput of a radio transmission link is enhanced by arranging a transmitter of data packets so that it responds to the transmission window closing by repeatedly retransmitting all unacknowledged data packets and doing so until the window reopens or a receiver status message acknowledges receipt of a retransmitted data packet.

7 Claims, 9 Drawing Sheets

FIG. 5

| SEQUENCE NUMBER | TRANSMIT ORDER NUMBER | CB |
|---|---|---|
| 50 | 831 | 0 |
| 51 | 832 | |
| 52 | 833 | |
| 53 | 834 | |
| 54 | 835 | |
| 51 | 836 | |
| 52 | 837 | |
| 55 | 838 | |
| 56 | 839 | |
| 57 | 840 | |
| 51 | 841 | |
| 58 | 842 | |
| 56 | 843 | |
| 51 | 844 | |
| 58 | 845 | |
| 56 | 846 | 1 |
| 51 | 847 | 1 |
| 58 | 848 | 1 |
| 56 | 849 | 1 |
| 51 | 850 | 1 |
| 51 | 851 | 1 |
| 51 | 852 | 1 |
| 51 | 853 | 1 |
| 59 | 854 | |

FIG. 6

| SEQUENCE NUMBER | TRANSMIT ORDER NUMBER | RETRANSMIT ENABLE | CB |
|---|---|---|---|
| 45 | 731 | | |
| 46 | 732 | | |
| 47 | 733 | | |
| 48 | 734 | 1 | |
| 49 | 735 | | |
| 50 | 736 | | |
| 51 | 737 | 1 | |
| 48 | 738 | 1 | |
| 52 | 739 | | |
| 53 | 740 | | |
| 48 | 741 | | |
| 51 | 742 | | |
| 54 | 743 | | |

```
                    a                    e
              ┌─────────┐        ┌──────────────┐
              40      47
┌────────┬───┬───┬────────┬──────────────┐
│SEQ.NO. │ 5 │ 1 │11111100│ - - - - - - -│ 8
└────────┴───┴───┴────────┴──────────────┘
              48      55
┌────────┬───┬───┬────────┬──────────────┐
│SEQ.NO. │ 6 │ 0 │01000000│ - - - - - - -│ 9
└────────┴───┴───┴────────┴──────────────┘
              40      47
┌────────┬───┬───┬────────┬──────────────┐
│SEQ.NO. │ 6 │ 1 │01000000│ - - - - - - -│ 10
└────────┴───┴───┴────────┴──────────────┘
              48      55
┌────────┬───┬───┬────────┬──────────────┐
│SEQ.NO. │ 6 │ 1 │01101000│ - - - - - - -│ 11
└────────┴───┴───┴────────┴──────────────┘
              48      55
┌────────┬───┬───┬────────┬──────────────┐
│SEQ.NO. │ 6 │ 1 │11111000│ - - - - - - -│ 12
└────────┴───┴───┴────────┴──────────────┘
```

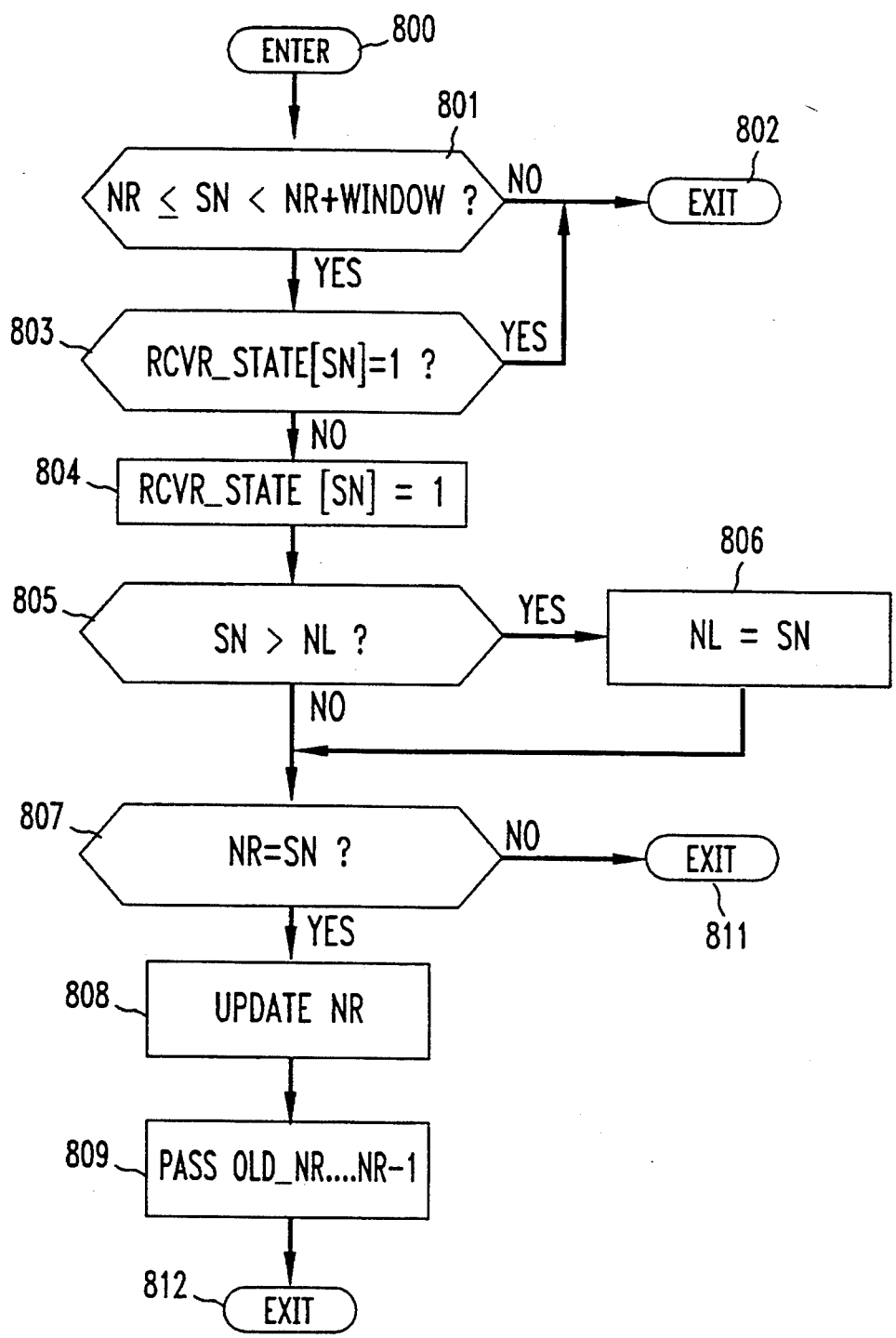

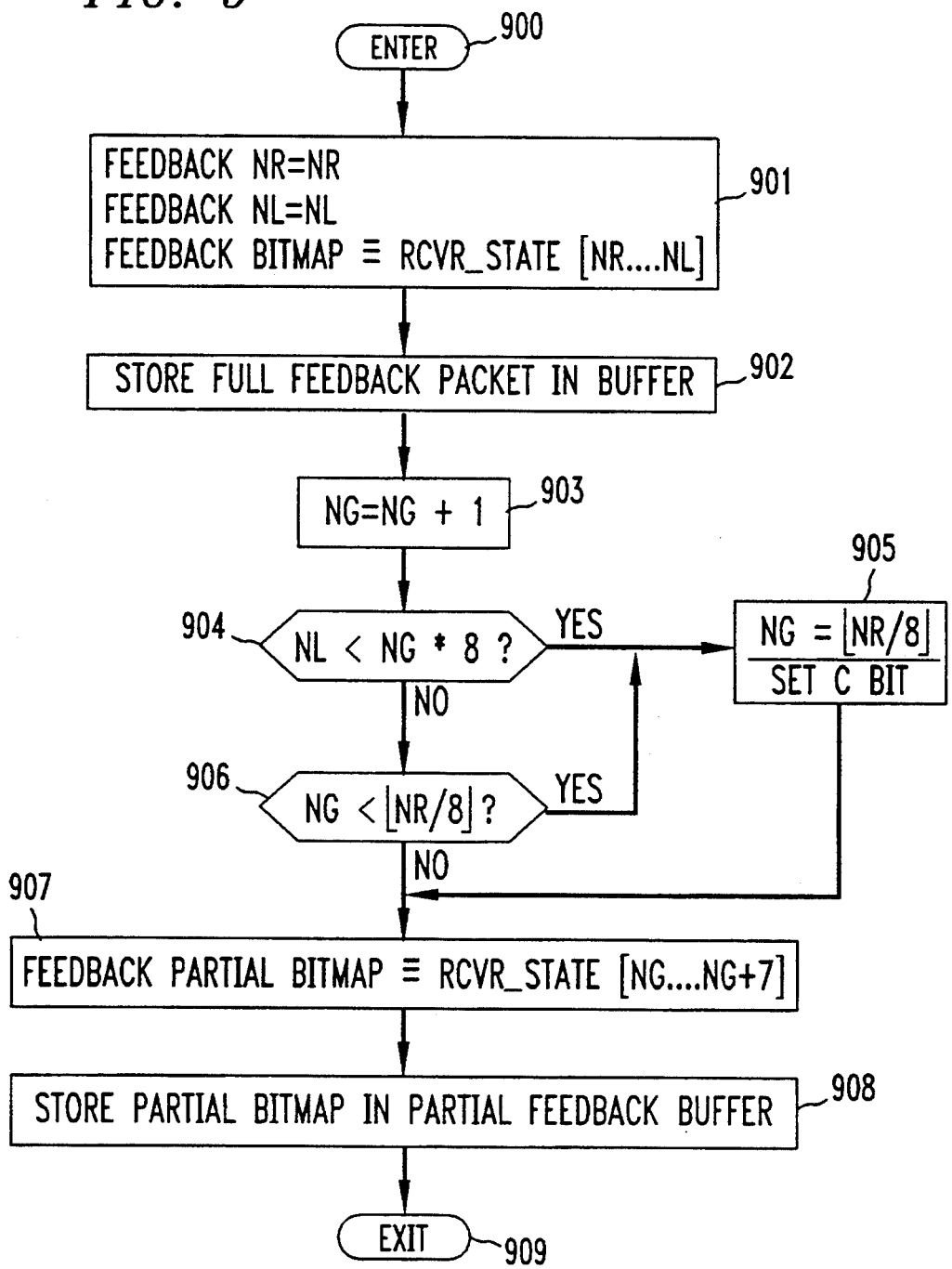

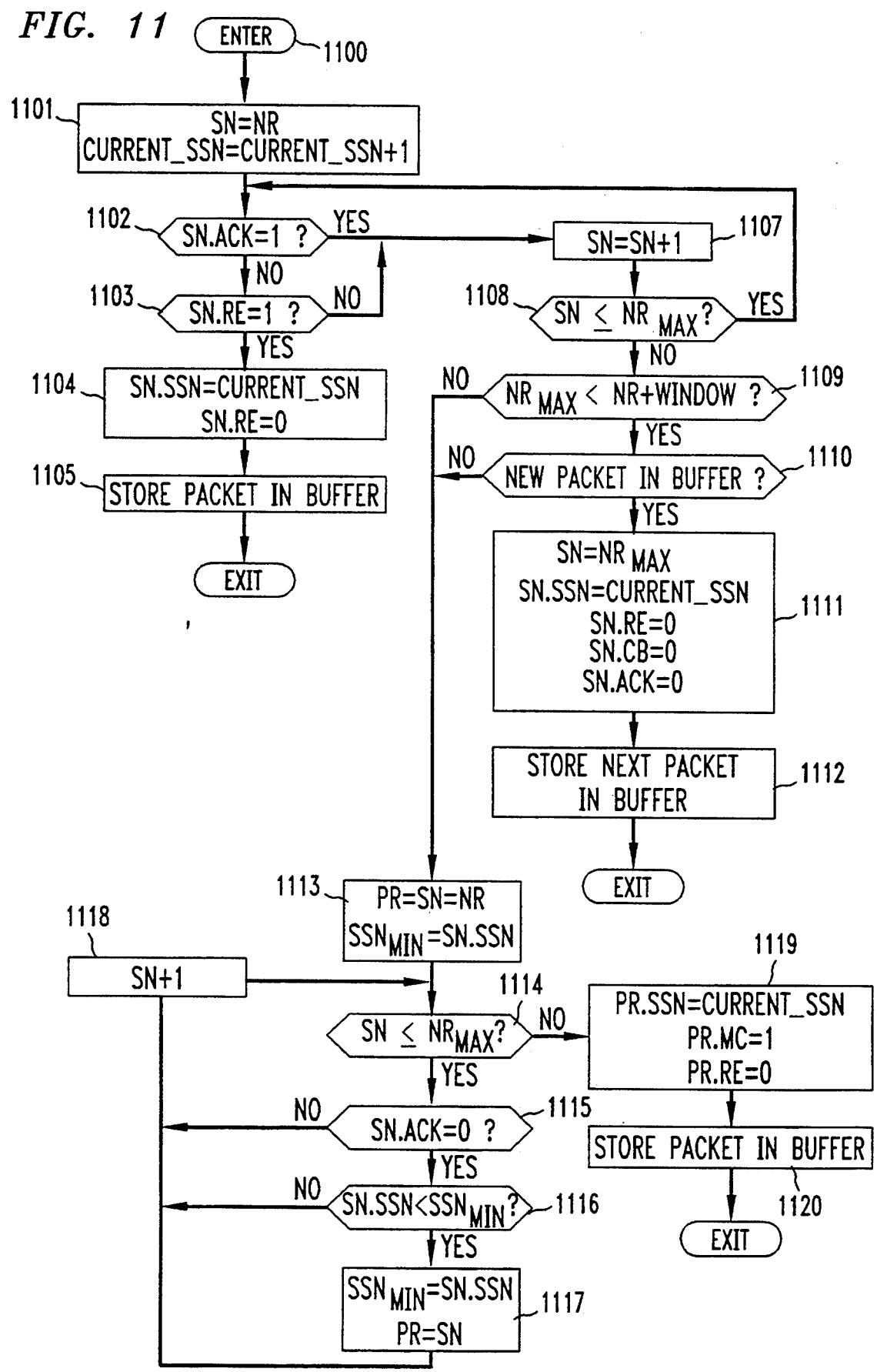

RETRANSMISSION PROTOCOL FOR WIRELESS COMMUNICATIONS

FILED OF THE INVENTION

The invention relates to wireless communications.

BACKGROUND OF THE INVENTION

It is well-known that wireless transmission is noisy and typically suffers from deep fades, which may last up to several hundreds of milliseconds. As such, it is likely that data packets transmitted over a wireless transmission link during adverse transmission conditions will need to be retransmitted one or more times. It can be appreciated that frequent retransmission of data packets decreases the throughput of a wireless transmission link. It can also be appreciated that stopping the retransmission of data packets whenever the transmission window closes also decreases such throughput.

Moreover, in a reverse mode (from a host receiver to a user transmitter) information that is transmitted from the host to the user is often preempted by a status packet noting which packets were received correctly and/or incorrectly by the receiver. As such, the bandwidth of the reverse transmission path that may be used for the transmission of information is decreased by the transmission of status packets. In some applications, such a decrease may be acceptable. However, when a high level of sustained duplex throughput is required, then such a decrease may not be acceptable.

SUMMARY OF THE INVENTION

In accord with an aspect of the invention, the throughput of a link is enhanced when the transmission window closes by repeatedly retransmitting those data packets that a receiver received incorrectly or not all and doing so until the window reopens for the transmission of data packets or a status message from the receiver indicates that a retransmitted data packet was received correctly.

In accord with another aspect of the invention, a status message may be either a full status message or a partial status message, in which a partial status message is appended to an information, or user, packet. In accord with another aspect of the invention, a partial status message includes a group number that associates an accompanying bitmap field reporting the status of a group of priorly transmitted data packets with respective sequence numbers that were assigned to the data packets as they were transmitted.

BRIEF DESCRIPTION OF THE DRAWINGS

FIGS. 5 and 6 are illustrative examples of a transmit list that the transmitter of FIG. 1 maintains in accord with the principles of the invention;

FIG. 7 illustrates a number of examples of partial status control messages;

FIGS. 8 and 9 show in flow chart form the program which implements the principles of the invention in the receiver of FIG. 2; and FIGS. 10 and 11 show in flow chart form the program which implements the principles of the invention in the transmitter of FIG. 1.

DETAILED DESCRIPTION

Figure 1:
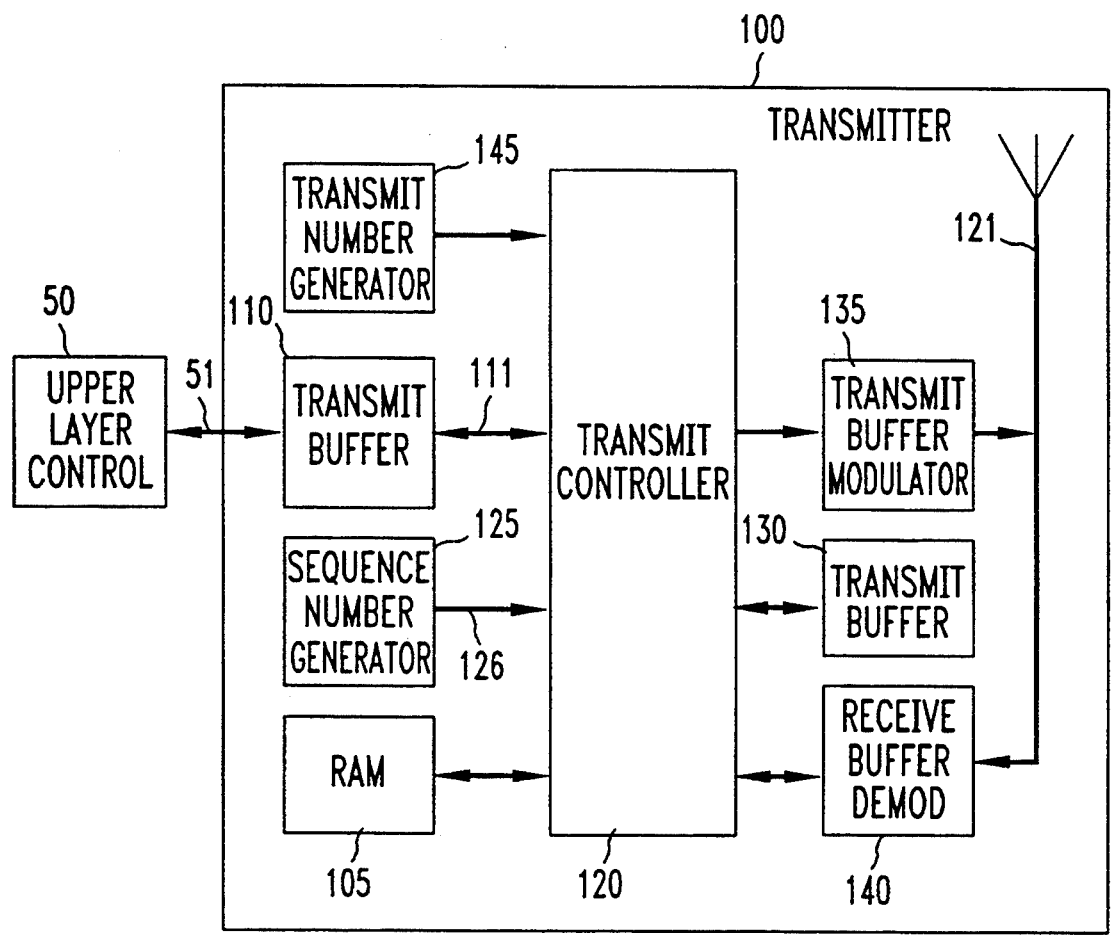
FIGS. 1 and 2 respectively show in broad block diagram form a transmitter and receiver in which the principles of the invention may be practiced.

In an exemplary embodiment of the invention, transmitter 100, FIG. 1, may constitute the transmitter section of a portable wireless terminal contained within a wireless communicator, in which the wireless terminal may be adapted to operate in accord with a predetermined protocol. Such a protocol may specify a so-called upper layer control 50 connected to transmit buffer 110 via bus 51, in which buffer 110 may be a conventional memory device, for example, a First-In-First-Out (FIFO) RAM memory. A data producing processor, serving as upper layer control 50, stores data packets formed from information words in sequential memory locations of buffer 110. After a data packet has been stored in buffer 110, it is then available for retrieval by controller 120 via bus 111. That is, controller 120 unloads data packets in the order that they have been stored in buffer 110 for the purpose of transmitting the data packets to receiver 200 (FIG. 2), as will be discussed below.

The aforementioned protocol may also specify a logical link control layer defining a number of functions for interfacing a wireless terminal with a host terminal via a wireless communications path for the purpose of exchanging data packets. At receiver 200, such functions include, inter alia, checking sequence numbers accompanying received data packets, error checking, generating status control messages and transmitting the messages to transmitter 100. In accord with an aspect of the invention, such status messages may be either a partial or full status message, as will be discussed below. At transmitter 100, such functions include, inter alia, the generation of sequence numbers, appending such sequence numbers to respective data packets that are unloaded from buffer 110, transmitting the packets to receiver 200 and retransmitting those dam packets which were not received correctly at receiver 200.

(It is noted that herein the term "appending" and variants of that term means adding to the list in a way that allows one to keep track of the order in which packets are transmitted. It is also noted that the following discussion pertaining to the operation of transmitter 100 (receiver 200, FIG. 2) equally pertains to the receiver 200 (transmitter 100) when they are operating in a full duplex mode. That is, transmitter 100 would include a receiver 200 and receiver 200 would include a transmitter 100).

The logical link control layer functions are implemented in transmitter 100 using, inter alia, controller 120, RAM buffer 105, sequence number generator 125 and transmit number generator 145. Sequence number generator 125, more particularly, may be a conventional modulo M counter, in which the value of M may be, for example, 128. Controller 120 accepts via bus 126 the current value generated by generator 125 and adds the value as a packet sequence number to the latest data packet that controller 120 unloads from transmit buffer 110. In addition, controller 120 generates an error check code which permits the receiver of the resulting data packet, e.g., receiver 200, to determine if the packet was received correctly without error. The error check code could be what is commonly referred to as a cyclic redundancy code.

After controller 120 forms a data packet it then loads the data packet in transmit buffer modulator 135. Transmit buffer modulator 135, in turn, modulates the data packet in a conventional manner using a carrier signal defining a radio channel assigned by host receiver 200. Modulator 135 then transmits the result via antenna 121. In addition, controller 120 stores a copy of the transmitted data packet in RAM 105 at a location that is indexed by the current sequence number. Accordingly, controller 120 may readily access a data packet that is stored in RAM 105 by using the sequence number associated with the packet as a RAM 105 index.

Transmitter 100 also includes transmit list buffer 130 that may be formed from a number of sequential RAM memory locations. Such a number may, for the sake of convenience and not limitation, correspond with the range of numbers generated by generator 125. In accord with an aspect of the invention, controller 120 stores in buffer 130 the sequence number of a packet that it transmits in association with a number generated by generator 145, in which the number is indicative of the order of each data packet that controller 120 transmits, including data packets that controller 120 retransmits. The reason for maintaining transmit list 130 will be made apparent below.

Figure 2:
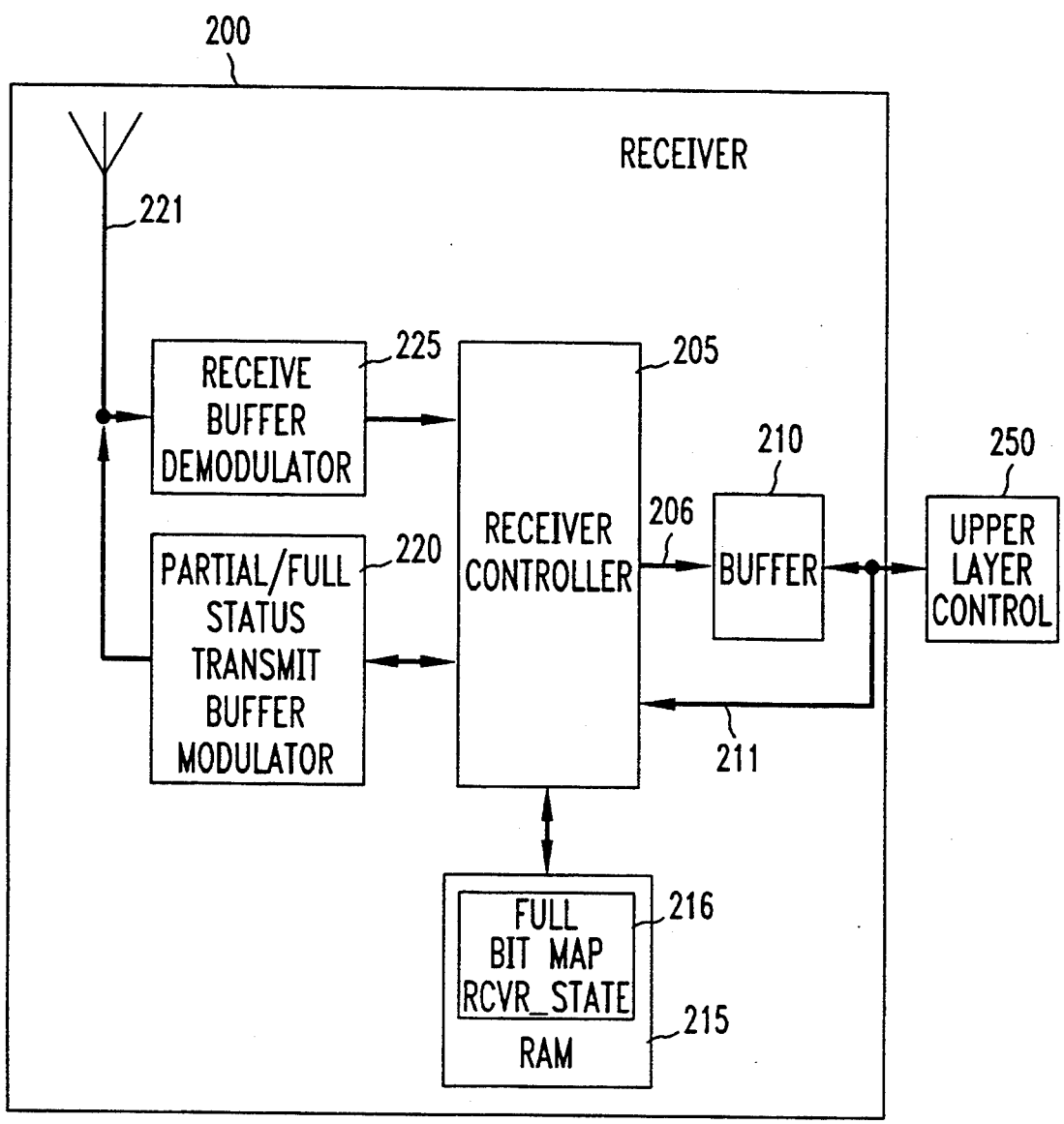

Referring to FIGS. 1 and 2, receiver 200 also includes an antenna 221 for receiving data packets that have been modulated by the carrier frequency of the aforementioned radio channel. Such receptions are received by demodulator 225, which demodulates the contents of the radio channel, forms the result into a data packet and stores the packet in an associated buffer. Receiver controller 205, in turn, unloads the packets from the buffer of demodulator 225 in the order that the packets are stored therein. Controller 205 checks each such packet to see if it contains any errors. Typically, such errors occur as a result of a packet being subjected to noise as it propagates through the air as a radio wave. If receive controller 205 finds that the received packet contains an error, then controller 205 discards the packet. If the received packet does not contain an error, then controller 205 stores the packet in receive buffer 210 via bus 206 at a location indexed by the sequence number that transmitter 100 appended to the packet. Thereafter, controller 205 unloads from buffer 210 those packets that are in sequence and passes them in order to upper layer control 250 via bus 211. For example, if packet numbers 21 through 24 and 26 are stored in buffer 210, then controller 205 passes packets 21 through 24 to upper control layer 250, but not packet 26 since it is out of sequence. Controller 205 passes packet 26 to upper control layer 250 only after packet 25 has been received correctly and stored in buffer 210.

To track which packets have been received correctly, incorrectly, or not at all, receive controller 205 maintains in RAM 215 a bit map 216 formed from a number of bits corresponding with respective ones of the aforementioned range of sequence numbers. When receive controller 205 receives correctly a data packet, it then sets to a particular binary value, e.g., a binary one, the bit whose position in the bit map corresponds with the sequence number contained in that data packet. For example, if the sequence number of a correctly received packet happens to be, for example, 27, then controller 205 sets the bit positioned at location 27 of bit map 216 to a binary one. If, on the other hand, a data packet is received incorrectly, for whatever reason, or received not at all, then the value of the corresponding bit in the bit map is set to an opposite binary value, e.g., a binary zero.

Figure 3:
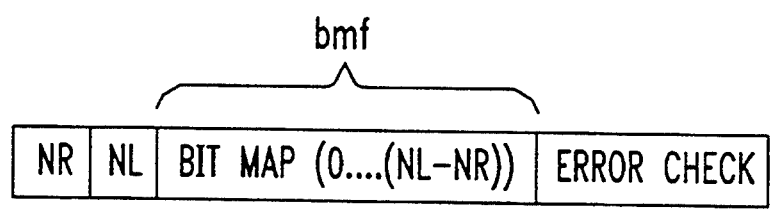
FIG. 3 is an illustrative example of the format of a status control packet that the receiver of FIG. 2 transmits to the transmitter of FIG. 1.

Periodically, receiver 200 sends to transmitter 100 via buffer modulator 220 a status control message indicating, inter alia, which packets were received correctly and not correctly (or not at all). (Hereinafter, reference to packets that were received not correctly will also include packets that were not received at all.) An illustrative example of a status control message is shown in FIG. 3. In particular, the error check field contains a conventional error check code that permits transmitter 100 to determine whether or not the status control message contains errors that may be due to channel noise and fading. The NR field contains a sequence number one larger than that of the last data packet that the receiver passed to its respective upper control layer. The NL field contains the largest sequence number packet that the receiver received correctly. Bit map field "bmf" is formed from bit map 216 (FIG. 1) and is the means by which receiver 200 "tells" transmitter 100 which data packets were received correctly or incorrectly. The bit positions of field "bmf" correspond with data packet sequence numbers relative to the sequence number contained in the NR field of the associated status message, in the manner discussed above. Similarly, the value of a bit in the bmf field indicates whether the corresponding data packet was received correctly (e.g., a binary one) or incorrectly (e.g., a binary zero), as mentioned above. For example, if the value in field NR happened to be 8, then bit NR+1 corresponds with data packet 9, bit NR+2 with data packet 10, bit NR+3 with data packet 11, and so on.

Figure 4:
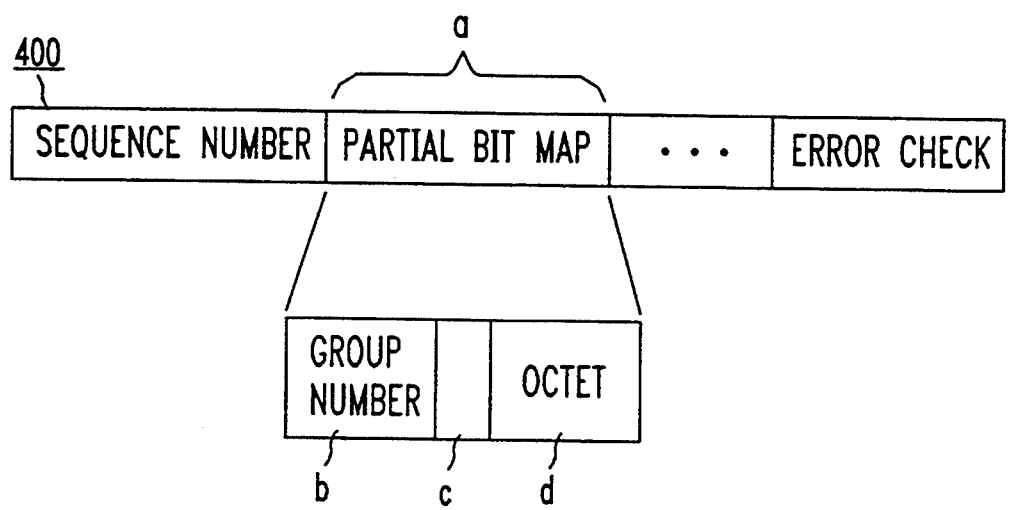
FIG. 4 is an illustrative example of the format of a partial status control message that the receiver of FIG. 2 appends, in accord with the principles of the invention, to an information packet and then transmits to the transmitter of FIG. 1.

If the level of traffic that receiver 200 transmits to transmitter 100 is not "heavy", then receiver 200 periodically transmits via buffer 220 the control, or status, message of FIG. 3. If such traffic is relatively heavy and a high level of sustained throughput is required in both directions (duplex operation), then receiver 200 transmits, in accord with an aspect of the invention, a partial version thereof, such that the receiver 200 appends the partial status control message to a user information packet. An illustrative example of a partial control message "a" is shown in FIG. 4 and is formed from a number of fields—illustratively three fields. Fields b, c and d respectively contain a group number, a bit indicating whether NR is in this group and a partial bit map comprising, e.g., eight bits. The group number, more particularly, is an address identifying a group, e.g., an octet, of bits contained in bit map 216. The bits forming field d respectively represent the status of the identified group of bits.

Thus, when traffic is heavy, receiver 200 may transmit, instead of a full status control message, a number of partial status control messages each appended to a respective information packet, in accord with an aspect of the invention. In this way, receiver 200 does not overburden the bandwidth of the reverse channel from the receiver to the transmitter during periods of heavy traffic, as will be discussed in detail below.

Returning to FIG. 1, buffer demodulator 140 monitors the reverse radio channel from receiver 200 to transmitter 100 and demodulates the carrier signal transmitted over that channel. Such demodulation results in the formation of a message (packet) that has been transmitted by receiver 200. Buffer demodulator 140 stores each such received message in associated memory, which is unloaded by controller 120. As mentioned above, such a message may be a status control message of the type shown in FIG. 3 (hereinafter also referred to as a "full" status control message.) Such a message may be also be an information packet, with or without a partial status control message appended thereto.

When controller 120 unloads a message (packet) from buffer 140 it examines the message to determine if it's either an information packet or full status control message. If the former, then controller 120 supplies the information packet to an associated receiver 200 (not shown) and to 225. Before doing so, controller 120 removes any partial status control message that may have been appended to the information packet. If the received packet is a full status control message, then controller 120 overwrites a bit map contained in RAM 105 using the contents of the status control message, in which the bit map is arranged similar to bit map 216. Controller 120 then determines which of the data packets that it transmitted were received correctly or incorrectly by receiver 200 as a function of the contents of the bit map stored in RAM 105 and the values of NR and NL contained in the received status control message. Transmitter 100 then retransmits those data packets which receiver 200 received incorrectly. However, to ensure against unnecessary multiple retransmissions of the same data packet, controller 120 maintains in transmit buffer 130 (FIG. 1) a list of the sequence numbers of respective data packets that controller 120 has transmitted, as mentioned above. Controller 120 also associates each packet that it transmits via buffer 135 with a transmits order number, as shown in FIG. 5, and as mentioned above.

For purposes of the following discussion, assume, for example, that controller 120 has transmitted a number of data packets associated with sequence numbers 50 through 54, respectively, to receiver 200 via buffer modulator 135. In doing so, controller stores each packet in transmit buffer 130 in the order that it is transmitted. Controller 120 also associates each such stored packet with a sequential transmit order number, as illustrated in FIG. 5. For example, it is seen that controller 120 has associated transmitted packets of sequence numbers 50 through 54 with transmit order numbers 831 through 835, respectively. Assume at this point that transmitter 100 receives a full status control message from receiver 200 after transmitting packet No. 54, but before transmitting packet No. 55. Assume also that the NR and NL values contained in the received message are 51 and 54, respectively, and, except for bit positions NR and NR+1, all of the bit positions up to and including NR+3 (i.e, 54) of the received bit map are set to a binary one.

Controller 120, responsive to such contents, determines which transmitted packets were received (a) correctly and passed to upper control layer 250, (e.g., packet No. 50) (b) correctly, but out of sequence (e.g., packet Nos. 53 and 54) or (c) incorrectly or not at all (e.g., packet Nos. 51 and 52). Based on the value of NR controller 120 erases from the list sequence numbers up to and including sequence No. 50, since those packets were received correctly and in sequence. Controller 120 also erases the associated packets from transmit buffer 130. However, controller 120 does not erase sequence Nos. 53 and 54 from the list, but marks them as being acknowledged. The reason for this is that although those packets were received correctly, they were received out of sequence. Controller 120 using list 500, then determines which packets were not acknowledged and are associated with transmit order numbers having values less than the largest transmit order number (referred to hereinafter as SL) associated with an acknowledged packet (i.e., 54). In doing so, controller 120 sets SL to 835 and stores the current value of SL in associated memory. Controller 120 then determines that sequence numbers 51 and 52 are associated with transmit order numbers 832 and 833, which are less than SL and marks packets Nos. 51 and 52 for retransmission. Based on that result, controller 120 supplies packet No. 51 to transmit buffer 135 for retransmission to receiver 200. When the latter packet has been transmitted, then controller 120 supplies packet No. 52 to buffer 135 for retransmission. In doing so, controller 120 re-enters the latter sequence numbers in list 500 following the entry for sequence number 54, as shown at 501 and 502, respectively. In addition, controller 120 associates the latter entries with successive transmit order numbers 836 and 837, respectively, to identify the latest transmit sequence for those packets. Controller 120 then transmits, in turn, the packets associated with sequence numbers 55 through 57 and enters those numbers in list 500 as they are supplied to buffer 135. In addition, controller 120 associates the latter sequence numbers with transmit order numbers 838 through 840, respectively, as shown in the FIG.

Assume at this point that transmitter 100 receives a status control message following the transmission of packet No. 57, but prior to the transmission of packet No. 58. Also assume that NR and NL again equal 51 and 54, respectively, and that, except for NR, all of the bits in the bit map up to and including NR+3 have a binary value of one. Similarly, controller 120 erases from the buffer all packets associated with sequence numbers that are less than NR. However, as previously discussed, controller 120 does not erase those packets that were received correctly, but not in sequence. Controller 120 then checks table 500 to determine which of the latter acknowledged packets is associated with the highest transmit order number. In doing so, controller 120 would find that the highest transmit order number is associated with retransmitted packet No. 52 (entry 502), and, therefore sets SL to 837. Controller further determines that the transmit order number associated with unacknowledged retransmitted packet 51 is 836 and less than SL. Accordingly, controller 120 supplies packet No. 51 to buffer 135 for retransmission and, when that packet has been transmitted, i.e., buffer 135 is empty, then controller 120 supplies, for the first time, packet 58 to buffer 135. In addition, sequence numbers 51 and 58 are added to list 500 in the order that they are transmitted and associated with transmit order numbers 841 and 842, respectively.

Assume at this point that transmitter 100 receives a status control message following the transmission of packet No. 58 but prior to the transmission of packet No. 59. Also assume that NR and NL are equal to 51 and 57, respectively, and that, except for NR and NR+5, all of the bits in the bit map up to and including NR+6 have a binary value of one. Similarly, controller 120 erases from the buffer all packets associated with sequence numbers that are less than NR. Similarly, controller 120 does not erase those packets that were received correctly, but out of sequence, namely packet Nos. 52 through 55 and 57. Controller 120 then checks table 500 to determine which of the latter acknowledged packets between NR and NL are associated with the highest transmit order number. In doing so, controller 120 finds that the highest transmit order number is associated with transmitted packet No. 57, as noted at entry 503, and therefore sets SL to 840. Accordingly, controller 120 supplies packet No. 56 (NR+5) to buffer 135 for retransmission, since the newly received bit map indicates that that packet had not been received correctly and since the transmit order number associated therewith (i.e., 839) is less than the current SL. However, controller 120 does not retransmit packet No. 51 even though the new bit map still indicates that that packet was received incorrectly. The reason for not retransmitting packet No. 51 is that the transmit order number currently associated with retransmitted packet No. 51 (i.e., 841) is greater than the current value of SL (840).

Assume at this point that following the retransmission of packet No. 56, the transmission window, which is assumed herein to be of size 8, closes. What this means is that the transmitter cannot transmit the packet with sequence number 59 until the packet with sequence number 51 (59 minus the window size) has been acknowledged. Moreover, all transmitted but unacknowledged packets (e.g., Nos. 51, 56 and 58) cannot be retransmitted, due to the current value of SL. In prior arrangements, when the window closes and no packets may be retransmitted, the transmitter stops its transmission of packets, including packets that remain unacknowledged, such as packet Nos. 56, 51 and 58. We have recognized that, in accord with an aspect of the invention, it is more advantageous to transmit all unacknowledged packets during the time that the window is closed and no packets are marked for transmission, rather than allowing the transmitter to enter an idle state and end its transmission of packets during this time, as was priorly done. Thus, when the window closes and no packets are marked for transmission, transmitter 100, in accord with an aspect of the invention, enters a preemptive retransmission state during which it automatically and continuously retransmits in round-robin fashion unacknowledged packets, which, in the present illustrative example would be packet Nos. 56, 51 and 58.

Accordingly, at this time, controller 120 supplies packets Nos. 56, 51 and 58, in turn, to transmit buffer 135 for transmission (retransmission) to receiver 200 and similarly adds those numbers to list 500 in association with respective sequential transmit order numbers, as shown at 505 through 507. These packets are transmitted, in order, from the lowest transmit order number to the highest. In addition, controller 120, in accord with an aspect of the invention, sets a multiple copy bit for each of those preemptively retransmitted packets as a way of identifying which packets have been preemptively retransmitted, as shown in column 510 of list 500. In accord with an aspect of the invention, controller 120 again preemptively retransmits packet Nos. 56 and 51, in turn, and similarly lists those numbers in list 500 along with the setting of the associated copy bit, as shown at 508 and 509.

Assume at this point that before controller 120 preemptively transmits packet No. 58 for the second time, transmitter 100 receives a status control message. Also assume that NR and NL contained in the newly received status control message are equal to 51 and 57, respectively, and that, except for NR all of the bits in the bit map up to and including NR+7 have a binary value of one. Similarly, controller 120 erases from the buffer all packets associated with sequence numbers that are less than NR. Similarly, controller 120 does not erase those packets that were received correctly, but out of sequence. However, in accord with an aspect of the invention, Controller 120 does not change SL and leaves SL set to 840 as long as the window is closed. Thus, the transmitter does not update SL using the transmit order number of an acknowledged packet when its associated copy bit is set. The reason for this is that multiple copies of the packet may have been transmitted and, therefore, it would be difficult to determine which transmit order number should be used to update SL.

Since, at this point, receipt of packets Nos. 56 and 58 by receiver 200 have been acknowledged, then transmitter 100 only preemptively retransmits packet No. 51. In doing so, controller 120 associates packet No. 51 with transmit order numbers 851, 852 and 853 each time it so retransmits, and sets the copy bit accordingly, as shown in table 500. Assume at this point, that a status control message is received from receiver 200, in which NR equals 59 and NL equals 58. At that point, the value of SL remains at 840, since the window had been closed and controller 120 has been in the preemptive retransmission mode as a result of the closed window and no packets are marked for retransmission. However, assume that based on the results of the received status control message, the transmission window is opened. As a result thereof, controller 120 may then transmit in the manner discussed above the next packets of the sequence, namely, the packets beginning with sequence number 59, as shown in table 500.

As mentioned above, during periods of heavy traffic between transmitter 100 and receiver 200, receiver 200 may begin transmitting partial status control messages, rather than a full status control message. As also mentioned above, a partial control message relates to a group of data packets, e.g., eight packets, whose receive status is defined by a group of bits, e.g., eight bits, representing a partial bit map. Receiver 200 appends the group of bits and a respective group number to a user information packet that is transmitted to transmitter 100, as mentioned above. Transmitter 100, responsive to receipt of such an information packet "strips off" the partial control message and then forwards the information packet to receiver buffer 225. Transmitter 100 then processes the partial status control message with respect to only those data packets that are indirectly identified in the message.

Specifically, assume at this point that the range of sequence numbers is zero through 127, and that controller 120 has just transmitted data packets bearing sequence numbers 45 through 48, respectively. Also assume that controller 120 has associated the latter data packets with transmit order numbers 731 through 734, respectively, and has stored that information in its associated transmit table 500, as shown in FIG. 6. It is seen that FIG. 6 is somewhat similar to FIG. 5, with the exception that FIG. 6 now includes an additional transmit enable field 520, which is discussed below. (In addition, as will also be discussed below, table 500 of FIG. 6 comprises 128 lines associated with sequence numbers 0–127, respectively.)

Also assume at this point that after transmitting packet No. 48, but before transmitting packet No. 49, transmitter 100 receives an information packet 8 bearing a partial bit map from receiver 200. An illustrative embodiment of the latter packet is shown in FIG. 7. Referring to both FIGS. 6 and 7, it is seen that the partial bit map "a" in packet 8 is directed to group number five (5), thereby indicating that the associated eight bits are indicative of the receive status (acknowledged (ACK) or unacknowledged (UNAK)) of the packets associated with that group, namely the data packets associated with sequence numbers 40 through 47, respectively. The subfield "c", when set to a binary 1, indicates that NR is represented by the first zero bit position in the associated partial bit map, and, when set to a binary zero, indicates that NR is not in the group. (The field designated "e" in packet 8 represents the remainder of the packet.)

Further assume that receiver 200 received correctly packet sequence Nos. zero through 44, i.e., groups zero through four, and had notified transmitter 100 of that fact via respective partial bit maps. As such, receiver 200 does not repeat the transmission of the latter partial bit maps, since those packets had been received correctly and transmitter 100 had been duly notified thereof and NR is now associated with group 5. At this point, assume that transmitter 100 has received bit maps that indicate that NR equals 45 and NL equals 44. However, receiver 200 continues to transmit a partial bit map for a group of packets if any one or more of those packets had been received incorrectly, as discussed below. Moreover, if the packets in more than one group are not received correctly, then receiver 200 transmits the associated partial bits maps to transmitter 100 in round-robin fashion, as will also be discussed below. When receiver 200 has correctly received all outstanding data packets and NR=NL+1, then receiver 200 continues to send bit maps identifying NR via field "c" as long as it continues to receive data packets of any type.

Specifically, responsive to receipt of information packet 8 of FIG. 7 (which is received after the transmission of packet 48, FIG. 6), transmitter 100 strips off the partial bit map "a", as mentioned above. Based on received partial bit map, NR=46, NL=45. In addition, SL is equal to 731 which is larger than the previous value of SL. Thus, SL is set to equal 731. Armed with that information, transmitter 100 processes the partial bit similarly to the way it processes a full bit map. In doing so, controller 120 enters a one in these retransmit enable field associated with the sequence numbers of the packets that it will retransmit to receiver 200. However, controller 120 does not mark (enable) packet Nos. 46 and 47 for retransmission, even though the received bit map 8 indicates that those packets are unacknowledged (UNAK). The reason for not so marking those packets for retransmission is that this information is ambiguous since the largest received sequence number, NL, equals 45. This may be a case in which packet Nos. 46 and 47 have not yet been received at receiver 200. Controller 120 then goes on to supply in turn transmit packet Nos. 49 through 51 to buffer 135 for transmission to receiver 200. Assume that after transmitting the latter packet, but before transmitting packet No. 52, transmitter 100 receives information packet 9. Similarly, controller 120 strips off partial bit map "a" from information packet 9 and forwards the packet to the intended destination.

It is seen that field "a" of packet 9 indicates that the bit map is associated with group 6 comprising packet Nos. 48 through 55 and that NR is not in this group. Moreover, NR still equals 45, NL equals 49 and SL equals 735. (Since 735 is larger than the value of SL (i.e., 731), then SL is set to equal 735.) As such, and as a result of processing the bit map, controller marks (enables using a value of one) the retransmit enable field associated with sequence number 48, since its transmit order number 734 is smaller than SL (735). (Although the status of packets with sequence numbers 46 and 47 may not be obtained from the current partial bit map, such status will be available upon receipt of a partial bit map for group 5, or if NR moves to group 6.) Following such marking, controller 120 then retransmits packet No. 48 based on the associated retransmit enable field being so marked. Assume that controller 120 then goes on to transmit packet No. 52 and receives information packet 10 after transmitting the latter packet.

It is seen that packet 10 carries a partial bit map containing NR, and implicitly acknowledges all packets having sequence numbers smaller than NR. As a result of controller 120 processing the partial bit map, NR equals 48 and packet Nos. 46 and 47 are implicitly acknowledged. SL remains equal to 735 since the transmit order numbers associated with packet Nos. 46 and 47 are less than 735. Accordingly, controller 120 does not retransmit any packets but does go on to transmit packet 53.

Assume at this point that transmitter 100 receives information packet 11 from receiver 200 and strips off bit map "a" and forwards the remainder to the intended recipient. As a result of processing the latter bit map, NR remains equal to 48, but NL and SL are changed to 52 and 739, respectively. Accordingly, controller 120 marks the transmit enable fields associated with transmit order numbers 737 and 738, since receiver 200 has not acknowledged receipt of the associated packets but acknowledged receipt of packet No. 52 associated with transmit order number 739. After such marking, controller 120 retransmits packet Nos. 48 and 51, in turn, and associates those packets with transmit order numbers 741 and 742, respectively.

Next assume that transmitter 100 receives information packet 12, which is similarly processed by controller 120. As a result thereof, NR, NL and SL are respectively set to equal 53, 52 and 739. Based on those values, controller 120 concludes that all packets through sequence No. 52 were acknowledged by receiver 200 and, therefore, there are no outstanding packets that need to be retransmitted. Accordingly, transmitter continues its transmission of data packets by supplying packet No. 54 to transmit buffer 135.

In a preferred embodiment of the invention, table 500 contains only 128 entries associated with sequence Nos. 0 though 127, respectively, as mentioned above. As such, table 500 is of a fixed size, in which only the contents of the transmit order number, acknowledgement status, retransmit enable and copy bit fields of a line changes. For example, FIG. 6 lists packet No. 48 three times in association with transmit order numbers 734, 738 and 741, respectively. In practice, sequence No. 48 is listed only once in table 500, even though it be retransmitted a number of times. That is, following the above example, the second time packet No. 48 is transmitted, transmit order number 734 is replaced number 738 at entry 48. Similarly, the third time that packet No. 48 is transmitted, then transmit order number 738 is replaced by 741, and so on.

The software which implements the invention in receiver 200 is shown in FIGS. 8 and 9 in flow chart form. Referring to FIG. 8 first, the program is entered at block 800 when it receives a data packet containing no errors and proceeds to block 801. At block 801, the program compares the sequence number (hereinafter "SN") contained in the received packet with the current value of NR. If SN is not between NR and (NR+window−1), inclusive, meaning that the receiver has already received that packet, then the program discards the received packet and then exits via block 802 to await receipt of the next packet. (Note that all operations on variables SN, NR, NL and NG are modulo operations determined by the range of each variable, namely, 128, 128, 128 and 16, respectively. Also, comparison operations are assumed to apply to values valid in the current window, i.e., between NR and (window−1), inclusive. If the window spans the value 0 (zero), then appropriate operations are assumed to maintain the natural sense of the operation.) Otherwise, the program proceeds to block 803 where it determines if the bit map RCVR_STATE has a value of 1 (one) at the location corresponding to sequence number SN. If that is the case, then the receiver concludes that it has already received a packet bearing this sequence number, and, therefore, exits at block 802. If that is not the case, then the program proceeds to block 804 where it stores the received data packet in sequence in buffer 210 and then updates the bit map stored in memory 215 as discussed above. The program then proceeds to block 805, where it checks to see if SN is greater than NL. If it is, then the program then proceeds to block 806 where it updates NL to equal SN. The program then proceeds to block 807.

At block 807, the program determines if NR equals SN. If not, then no new in-sequence data is available for delivery to the upper-layer control 250 and, therefore, exits at 811. Otherwise, the program concludes that such data is available and proceeds to block 808. At block 808, the program determines the new value for NR based on the number of in-sequence packets available for delivery to the upperlayer. Following the foregoing, the program then determines the sequence number that corresponds to the first entry in RCVR_STATE that is equal to zero. This is the new value of NR. The program then proceeds to block 809 where it passes to the upper layer all in-sequence data packets having numbers between the previous value of NR and one less than the new value of NR. The program then exits via block 812.

Turning now to FIG. 9, the receiver program which generates a status control message, partial and full, is entered at block 900 where it proceeds to block 901. At block 901, the program generates a full status control message based on the bit map stored in memory RAM 215 and the current values of NR and NL. The program (block 902) then stores the full status control message in buffer 220. At block 903, the program increments NG and checks to see (block 904) if the value of NL is less than the value of NG times 8 or (Block 906) that the current value of NG is less than the integer portion of the result obtained from NR/8. If either test is true, then the program (block 905) sets NG to the integer portion of the result obtained from NR/8 and indicates that NR is represented by the first 0 (zero) value in the bit map. The program (block 907) then generates a partial status control message using the state of the bits in bitmap 216 that are associated with the group specified by the value of NG. The program (block 908) then stores the partial status control message in buffer 220. The program then exits via block 909.

At buffer 220, the full status control message is transmitted if no user information packet is stored in buffer 220. If a user information packet is so stored, then buffer 220 appends the partial status control message thereto and then transmits the result.

Figure 10:
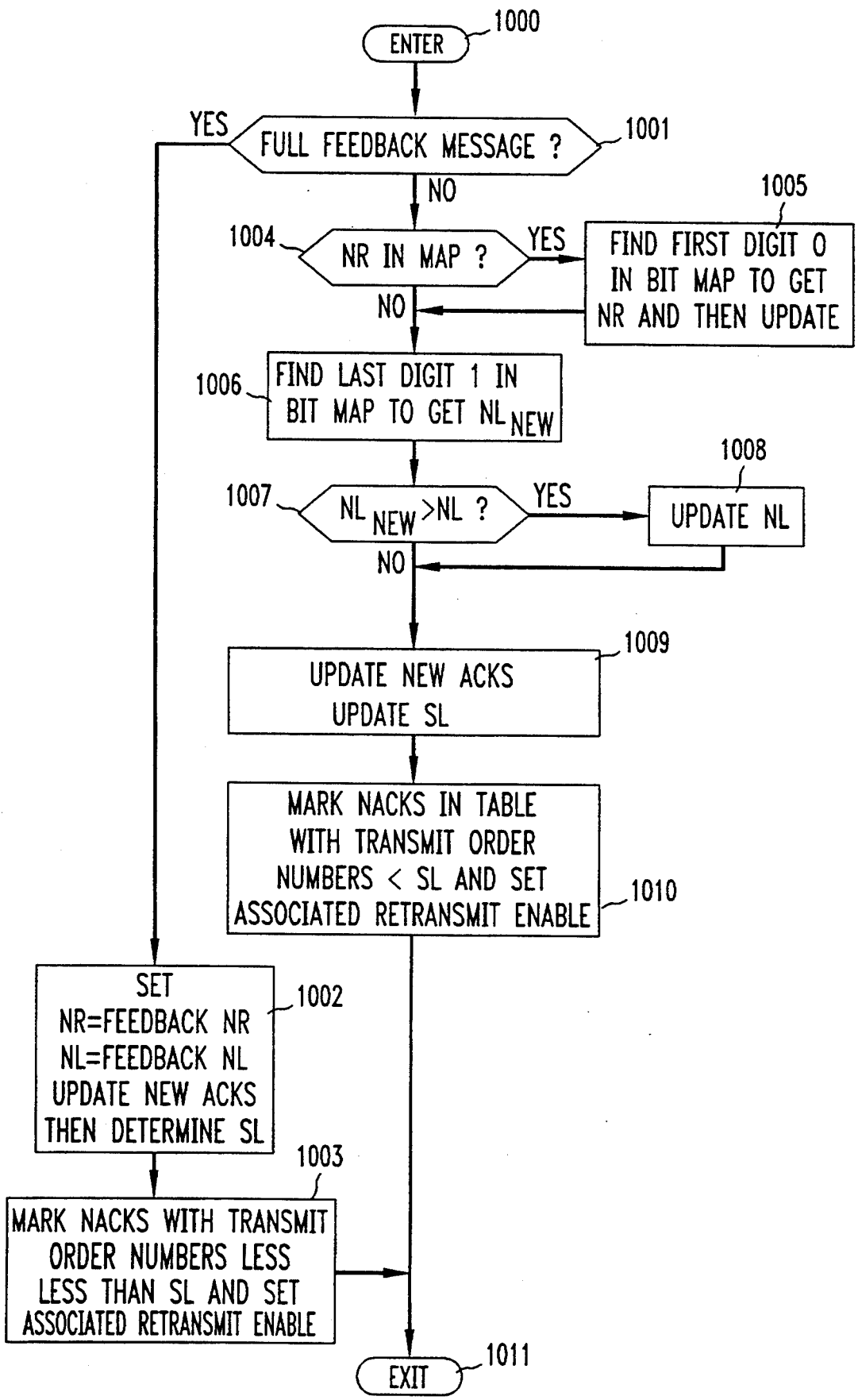

FIG. 10 illustrates the program that is entered at transmitter 100 when a status control message is received. Specifically, the program is entered at block 1000 where it proceeds to block 1001. At block 1001, the program proceeds to block 1002 if the status message is a full status control message. Otherwise, it proceeds to block 1004.

At block 1002, the program updates the contents of the full bit map that is stored in RAM 105 and updates the values of NR and NL as specified by the data in the received status message. The program next determines the value of SL, which is the greater of the current SL and the transmit order numbers of the newly acknowledged packets, and then proceeds to block 1003 where it marks the enable bits of those packets that are to be retransmitted and whose transmit order numbers are less than SL. The program then exits via block 1011.

At block 1004, the program checks to see if NR is contained in the received partial status control message (via field 'c', FIG. 4). If it is, then the program (block 1005) determines the value of NR based on the binary values of the bits forming the associated octet. The program (block 1006) next determines the new value of NL for the latter octet of bits. The program (block 1007) then checks to see if NLnew is greater than the current value of NL, and sets NL to equal NLnew if that is the case (block 1008). The program (block 1009) then marks data packets which have been acknowledged and then updates the value of SL based on the contents of the partial status control message. The program (block 1010) then sets the retransmit enable bits for those data packets which the latter control message indicates were not acknowledged and whose transmit order number (SSN) is less than SL. The program then exits.

The program of FIG. 11 is entered at block 1100 whenever transmit buffer 135 is empty. Specifically, the program first determines which packet is to be retransmitted, if any. The program achieves this via blocks 1101–1103, 1107 and 1108 which represent a program loop that searches table 500 (FIG. 5 or 6), starting at NR, to locate the smallest sequence number for an unacknowledged packet whose retransmit enable is set to a one. If that sequence number is found, then the program (block 1104) clears the retransmit enable bit for that sequence number and associates the sequence number with the next sequential transmit order number (SSN). The program (block 1105) then stores the associated packet in buffer 135 and then exits. The program is thereafter reentered at block 1100 when buffer 135 is again empty.

If no packet having a sequence number between NR and NRmax is found with its associated transmit enable set to a one, then the program proceeds to block 1109. At block 1109, the program checks to see if NRmax is less than NR+(transmit window). If so, then the program (block 1110) checks buffer 110 to see if contains a data packet. If it does, then the program (block 1111) associates that packet with the next sequence number as well as the the next sequential transmit order number and stores that result in RAM 105. The program then stores the packet in buffer 135 for transmission to receiver 200. The program then exits.

If the transmit window is found to be closed (block 1109) or no new packet is to be transmitted (block 1110), then the program proceeds to block 1113. Blocks 1113 though 1118 represent a looping program which searches for the smallest transmit order number (SSN) that is associated with an unacknowledged packet. When the program finds that number it then preemptively retransmits the associated packet. In doing so, the program (blocks 1119 and 1120) (a) sets the copy bit for that packet to a binary value of one, (b) associates the packet with the next transmit order number and (c) stores the packet in buffer 135. As mentioned above, the program is thereafter reentered at block 1100 when transmit buffer 135 becomes empty.

The foregoing is merely illustrative of the principles of the invention. Those skilled in the an will be able to devise numerous arrangements, which, although not explicitly shown or described herein, nevertheless embody those principles that are within the spirit and scope of the claimed invention.

We claim:

1. A data packet retransmission arrangement for use in a communications system comprising
    means for transmitting data packets to a receiver and associating said transmitted data packets with respective transmit order numbers as they are transmitted,
    means, responsive to receipt of a status message identifying the transmitted data packets that were received correctly and incorrectly by said receiver, for retransmitting only those of said incorrectly received data packets whose associated transmit order numbers precede a transmit order number associated with a transmitted data packet identified in said message as being the last of the correctly received data packets, and
    means, operative whenever a window for transmitting data packets closes, for retransmitting, in turn, data packets that have been received incorrectly by said receiver when said window was open and repeating the retransmission of each such data packet until either said window opens for the transmitting of data packets or receipt of a status message indicates that the data packet was received correctly.

2. The data packet retransmission arrangement set forth in claim 1 wherein said status message is a full status message comprising at least a bit map field, a field identifying the last data packet correctly received and a field identifying the last data packet correctly received in proper sequence, said bit map field being formed from a number of bits associated with respective sequence numbers that are appended to respective ones of said data packets in the order that said data packets are transmitted.

3. The data packet retransmission arrangement set forth in claim 1 wherein said communications system is a wireless telephone system.

4. The data packet retransmission arrangement set forth in claim 1 wherein said status message is a partial status message inserted in a user information packet, said partial status message comprising at least (a) a bit map field formed from a group of bits associated with a group of respective sequence numbers assigned to respective ones of a group of data packets in the order that said group of data packets are transmitted and (b) a group number defining a relationship between said group of sequence numbers and another group of sequence numbers.

5. The data packet retransmission arrangement set forth in claim 3 wherein said partial status message further comprises a field identifying the last data packet received correctly and in proper sequence.

6. A data packet retransmission arrangement for use in a communications system comprising
    means for receiving data packets from a transmitter of data packets,
    means for forming a partial status message including at least (a) a group number identifying a group of respective sequence numbers associated with respective ones of a group of received data packets, and (b) a group of bits having respective bit positions in said group corresponding with respective ones of the sequence numbers of said group of sequence numbers and in which the binary value of each bit of said group and said group number indicates whether the corresponding one of said data packets was received correctly, and
    means for appending said partial status message to a data packet and for transmitting said data packet to said transmitter.

7. The data packet retransmission arrangement of claim 6 further comprising at said transmitter
    means for receiving said data packet containing said partial status message, for removing said partial status message from said data packet and then forwarding said data packet to its intended destination, and
    means for determining which data packets of said group of data packets are to be retransmitted as a function of the values of respective ones of the bits of the group bits forming said partial status message.

* * * * *